United States Patent
Steinle et al.

(10) Patent No.: US 8,193,922 B2
(45) Date of Patent: Jun. 5, 2012

(54) METHOD FOR WARNING THE DRIVER OF A MOTOR VEHICLE EQUIPPED WITH A CRUISE CONTROL SYSTEM

(75) Inventors: Joachim Steinle, Munich (DE); Oliver Tschernoster, Munich (DE); Bartono Adiprasito, Neuching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 671 days.

(21) Appl. No.: 12/048,301

(22) Filed: Mar. 14, 2008

(65) Prior Publication Data
US 2008/0186157 A1  Aug. 7, 2008

Related U.S. Application Data

(63) Continuation of application No. PCT/EP2006/008127, filed on Aug. 17, 2006.

(30) Foreign Application Priority Data

Sep. 17, 2005 (DE) .......................... 10 2005 044 455

(51) Int. Cl.
*B60Q 1/00* (2006.01)
*B60T 8/32* (2006.01)
*B60T 7/12* (2006.01)

(52) U.S. Cl. ......... 340/436; 340/435; 340/438; 340/457
(58) Field of Classification Search .................... 340/436
See application file for complete search history.

(56) References Cited

U.S. PATENT DOCUMENTS

| | | | | |
|---|---|---|---|---|
| 4,353,055 | A * | 10/1982 | Kawakatsu et al. | 340/457 |
| 4,495,484 | A * | 1/1985 | Kawakatsu et al. | 340/457 |
| 6,009,368 | A * | 12/1999 | Labuhn et al. | 701/96 |
| 6,081,763 | A * | 6/2000 | Smith et al. | 701/93 |
| 6,246,313 | B1 | 6/2001 | Baeker et al. | |
| 6,362,729 | B1 * | 3/2002 | Hellmann et al. | 340/436 |
| 7,016,783 | B2 * | 3/2006 | Hac et al. | 701/301 |
| 7,099,766 | B2 * | 8/2006 | Michi et al. | 701/96 |
| 7,117,077 | B2 * | 10/2006 | Michi et al. | 701/96 |
| 2004/0193354 | A1 * | 9/2004 | Dunoyer et al. | 701/96 |
| 2005/0150701 | A1 * | 7/2005 | Michi et al. | 180/170 |

(Continued)

FOREIGN PATENT DOCUMENTS

DE  198 33 645 A1  1/2000

(Continued)

OTHER PUBLICATIONS

German Search Report dated Aug. 14, 2007 with English translation of relevant portions (Nine (9) pages).

(Continued)

*Primary Examiner* — Julie Lieu
(74) *Attorney, Agent, or Firm* — Crowell & Moring LLP

(57) ABSTRACT

A method is provided for warning the driver of a motor vehicle equipped with a distance-related cruise control system of a potentially hazardous situation. The motor vehicle is kept at a standstill during the distance-related cruise control using a braking torque applied by the distance-related cruise control system. Leaving of the motor vehicle, or an intention of the driver to leave the motor vehicle, is recognized. When the leaving or the intention to leave of the driver is recognized, the applied braking torque is changed and/or modulated in such a manner that the motor vehicle experiences a movement perceptible by the driver.

11 Claims, 1 Drawing Sheet

U.S. PATENT DOCUMENTS

2008/0186157 A1 * 8/2008 Steinle et al. ................. 340/453

FOREIGN PATENT DOCUMENTS

| | | |
|---|---|---|
| DE | 198 57 992 A1 | 6/2000 |
| DE | 101 51 717 A1 | 4/2003 |
| DE | 103 20 722 A1 | 11/2004 |
| DE | 103 48 916 A1 | 6/2005 |
| EP | 0 348 691 A2 | 1/1990 |
| EP | 0 976 628 A2 | 2/2000 |
| EP | 0 992 386 A1 | 4/2000 |
| FR | 2 789 950 A1 | 8/2000 |
| WO | WO 86/04869 A1 | 8/1986 |
| WO | WO 03/076226 A1 | 9/2003 |

OTHER PUBLICATIONS

International Search Report Nov. 17, 2006 with English translation of relevant portions (Six (6) pages).

* cited by examiner

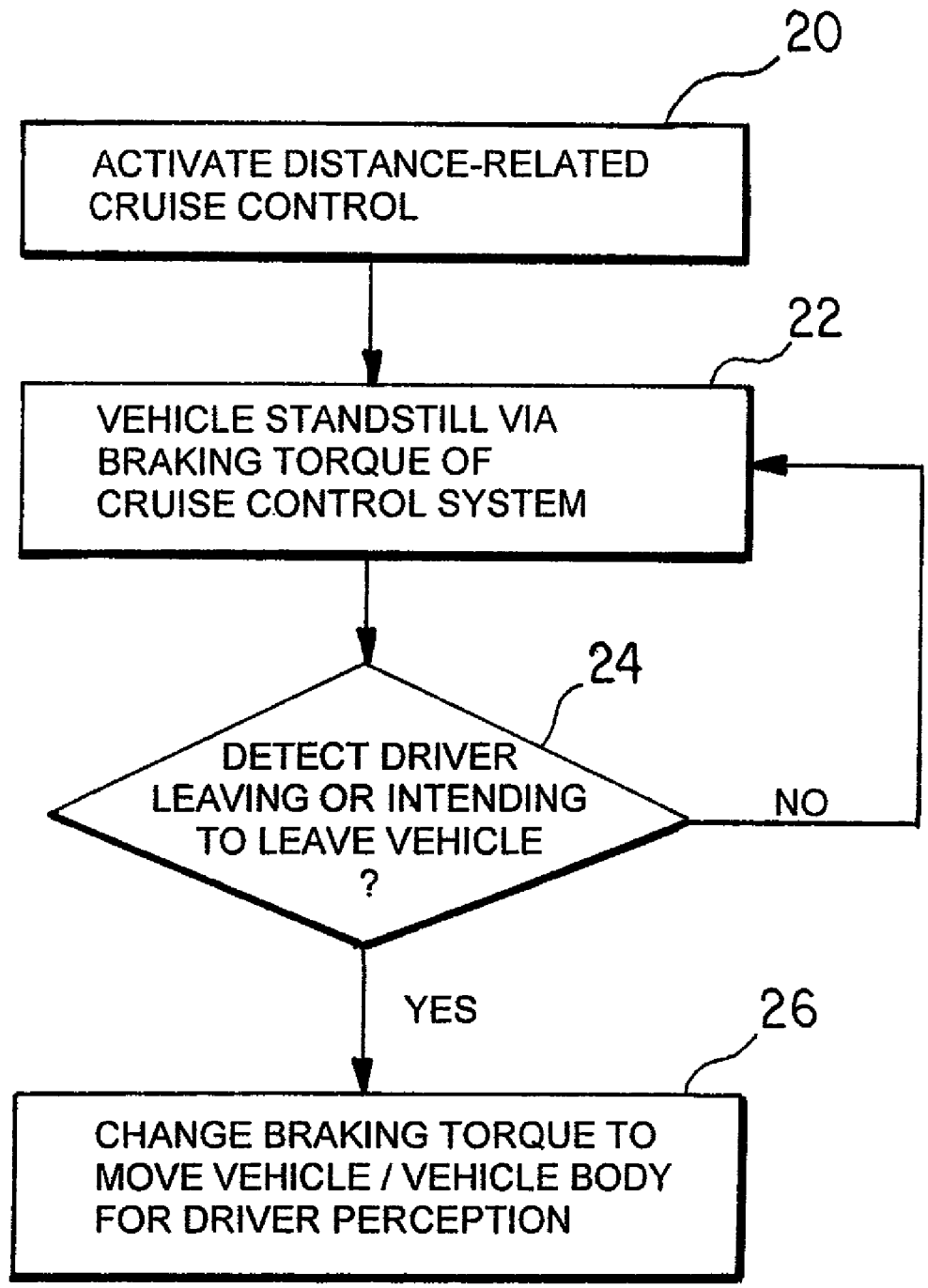

METHOD FOR WARNING THE DRIVER OF A MOTOR VEHICLE EQUIPPED WITH A CRUISE CONTROL SYSTEM

CROSS-REFERENCE TO RELATED APPLICATIONS

This application is a continuation of PCT International Application No. PCT/EP2006/008127, filed on Aug. 17, 2006, which claims priority under 35 U.S.C. §119 to German Application No. 10 2005 044 455.5, filed Sep. 17, 2005, the entire disclosures of which are expressly incorporated by reference herein.

BACKGROUND AND SUMMARY OF THE INVENTION

The invention relates to a method for warning the driver of a motor vehicle of a particular situation, which vehicle is equipped with a distance-related cruise control system.

Motor vehicles having a distance-related cruise control system are already available from various manufacturers. A system of this type, offered by the assignee of the present application, for example, under the name "active cruise control," allows the motor vehicle to move automatically at a desired (or a correspondingly lower) speed while maintaining a defined distance to a motor vehicle traveling in front (such a motor vehicle in front being referred to as a target object). In principle, the active cruise control expands upon the generally known cruise control, which maintains a specific predefined speed, by including an additional distance control function, so that the use of the "active" cruise control is possible even in dense freeway and expressway traffic. This so-called "active cruise control" maintains the predefined desired speed if the vehicle's own lane is clear. If a distance sensor system attached to the motor vehicle, which may operate in particular based on radar, recognizes a target object (such as a motor vehicle traveling ahead) in its own lane, then the motor vehicle's speed is adapted to the speed of the motor vehicle or target object traveling ahead, for example, by applying a suitable braking torque, such that a distance controller contained in the "active cruise control" and/or in the corresponding speed control system automatically maintains a distance to the motor vehicle or target object traveling ahead, which distance is appropriate for the driving situation.

In systems of this type, however, the achievable braking effect, which is generated by the applied braking torque, is limited to a maximum value. For the case in which the achievable braking effect is inadequate for the vehicle to come to a standstill at a safe distance behind a vehicle traveling ahead, it becomes necessary, for example, to make the driver aware of this state. This may be performed by an acoustic signal, for example.

A device for kinesthetic signaling to the driver of a motor vehicle, which is triggered when a shutoff is imminent of the distance-related cruise control system, which is intended or caused by a functional disturbance, or when a required braking effect may not be applied by the control system, is known from DE 198 57 992. The kinesthetic signaling in DE '992 is performed by activating the deceleration unit in such a manner that the motor vehicle experiences an oscillating deceleration, which is sensed by the driver.

"Active cruise control" systems of the above-mentioned type are only usable in a speed range of approximately from 30-180 km/h. In the speed range below 30 km/h, such a system is not activatable or shuts off automatically according to a specific algorithm. Stationary target objects also may not be used by the system, or may only be used in a limited way for the control.

To also be able to use a speed control system having a distance sensor system in the speed range below 30 km/h, for example, in particular in traffic jam situations, requires that a sensor viewing range be expanded by additional sensors. Furthermore, an algorithm must be able to differentiate between relevant stationary and traveling target objects. One possible system implementation may include differentiating between a typical control range, in which no reaction to stationary targets occurs, and a stop-and-go range, in which stationary target objects are reacted to. This so-called stop-and-go range may have an upper speed restriction limiting value, e.g., in the magnitude of 30 km/h. A distance-related cruise control system expanded in this manner is known, for example, from DE 101 51 717 A1.

In systems of this type, without additional technical features, the possibility exists that the driver, while the motor vehicle was kept stationary by an applied braking torque via the distance-related cruise control system, will get out of the vehicle and forget that the vehicle is only kept stationary because of the active control. In current systems, the driver is usually made aware of this circumstance using an acoustic and/or visual signal.

The object of the invention is to specify a method for warning the driver in a hazard situation, as described above, which is improved in regard to the perceptibility of the warning signal.

According to the invention, a method is provided for warning the driver of a motor vehicle, which is equipped with a distance-related cruise control system, of a hazard situation. With such a distance-related cruise control system, the motor vehicle is kept at a standstill during the distance-related cruise control using an applied braking torque. The method recognizes the leaving of the motor vehicle, or an intention of the driver to leave the motor vehicle. When the method recognizes a leaving the motor vehicle, or upon recognizing an intention to leave the motor vehicle, the applied braking torque is changed and/or modulated in such a manner that the motor vehicle experiences a movement and/or oscillation that is perceptible to the driver.

Other objects, advantages and novel features of the present invention will become apparent from the following detailed description when considered in conjunction with the accompanying drawing.

BRIEF DESCRIPTION OF THE DRAWING

FIG. 1 is a flow chart illustrating an embodiment of a method for warning a motor vehicle driver of a hazardous situation, which motor vehicle is equipped with a cruise control system.

DETAILED DESCRIPTION OF THE DRAWING

Referring to the Figure, there is shown a simplified flow chart illustrating an embodiment of the invention for providing a warning method to a motor vehicle driver of a hazardous situation. The motor vehicle is equipped with a distance-related cruise control system. When the distance-related cruise control system is activated (step 20), the vehicle may be kept at a standstill using a braking torque applied by the distance-related cruise control system (step 22). The method detects an intention of the vehicle driver to leave the vehicle, or an actual leaving of the vehicle by the vehicle driver (step 24). When the method recognizes the leaving or intention to leave by the driver, the distance-related cruise control system changes the braking torque applied by the system to cause a movement of the vehicle or the vehicle body that may be perceived by the driver (step 26). As a result, the driver is made aware that the vehicle is only kept at the standstill due to the distance-related cruise control system, in which the case the driver may take an appropriate action.

The movement and/or oscillation of the motor vehicle does not necessarily have to result in a significant position change of the motor vehicle. Rather, the change and/or modulation of the braking torque may solely result in shaking of the vehicle body, while the motor vehicle itself essentially still remains at its original position.

By way of this movement of the vehicle (or the vehicle body), the driver is made aware that the vehicle is only kept at a standstill because of the distance-related cruise control system and not because of typical handling, such as the actuation of a parking brake. The driver himself thus has the possibility of preventing unintended rolling of the vehicle, e.g., such as may occur due to a defect in the cruise control system.

The applied braking torque is advantageously changed and/or modulated to provide the warning by reducing it at least once for a predefined time, which is to be very brief. This means that the braking force applied to the braked wheels is also briefly reduced for this time, and is again applied in the original manner after this time. The body of the motor vehicle thus experiences a movement in the form of a jerk, which is perceptible to the driver.

The braking torque may advantageously also be reduced to zero during this time. The time period is to be selected such that, on one hand, unintended rolling of the vehicle does not occur and, on the other hand, the resulting vehicle movement is perceptible to the driver as a warning.

This reduction of the braking torque may occur once, or it may occur multiple times in a sequence at short intervals, by which the motor vehicle itself or the vehicle body is set into high-frequency oscillation.

The intention of the driver to leave the motor vehicle is advantageously recognized, for example, by analyzing a seat belt contact signal, by analyzing a door closing signal, by analyzing signals of an interior sensing system, and/or by analyzing a signal of a steering wheel contact recognition unit. Analyses of this type offer the advantage that the signals are already available and provided for in the motor vehicle since they are analyzed for other control purposes and/or regulation. An analysis of this type thus represents a simple and cost-effective variant for recognizing that the driver intends to leave the vehicle.

The interior sensing system cited here may be a system which solely detects objects and possibly their position in the vehicle interior, or also a system which may also classify the detected objects. The group of the first-mentioned interior sensing systems includes, for example, typical break-in (theft) warning systems, as are currently present in many vehicles. The group of the second-mentioned interior sensing systems includes, for example, interior monitoring systems, which typically analyze the signals of a video camera.

The steering wheel contact recognition unit may be a steering wheel sensor system, which indicates whether the driver has his hands, or at least one hand, on the steering wheel.

Early recognition of the intention to leave is possible through all of the signals, which offers the advantage that the driver also still perceives the movement of the motor vehicle with very high probability and may react thereto.

Additionally or alternatively, a signal of a (mechanically operating) seat occupation sensor for the driver's seat may also be analyzed and, if an occupied seat is not detected, the change and/or modulation of the applied braking torque may be performed.

In addition to this kinesthetic signaling, an acoustic, visual, and/or haptic warning signal may advantageously be generated for the driver. An acoustic warning may, for example, be a signal tone broadcast via the loudspeakers, while a visual warning signal may be a blinking indicator in the display in front of the driver or an LED on the driver's door. A haptic warning signal may result in a vibration of the steering wheel, for example, which will only have the desired result if the driver still has at least one hand on the steering wheel.

A multistage or escalating warning may advantageously also be generated. Thus, for example, it is contemplated that, when an intention of the driver to leave the vehicle is recognized, only a visual warning occurs in a first warning stage, and in a second stage, which is reached when actual leaving of the motor vehicle is recognized, a combination of an acoustic and the kinesthetic warning according to the invention occurs. However, any other combination of visual, acoustic, haptic, and/or kinesthetic warnings is also possible.

In case of recognizing the leaving or the intention to leave of the driver, the motor vehicle may advantageously be set into oscillations by targeted activation of drive actuators. According to this embodiment, the driver may also be warned when the motor vehicle is kept stationary on a slight uphill. Opening the brakes would not necessarily result in a detectable jerk here. If the drive is activated simultaneously with an open brake, a certain propulsion may be ensured and thus a jerk may also occur in this situation. This is also true on level ground if no gear is engaged, for example.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for warning a driver of a motor vehicle, equipped with a distance-related cruise control system, of a potentially hazardous situation, the method comprising the acts of:

maintaining the motor vehicle at stationary position using a braking torque applied by the distance-related cruise control system;

analyzing signals of the motor vehicle indicative of whether the driver may attempt to leave the motor vehicle to determine that the driver may attempt to leave the motor vehicle while the distance-related cruise control system is still active and continues to apply the braking torque to maintain the vehicle in the stationary position; and changing the braking torque applied by the distance-related cruise control system to cause a movement from the stationary position of at least one of the motor vehicle and a body of the motor vehicle upon determining that the driver may attempt to leave the motor vehicle.

2. The method according to claim 1, wherein the act of changing the applied braking torque is performed by reducing the braking torque at least once for a predefined time period.

3. The method according to claim 2, wherein the act of reducing the applied braking torque reduces the braking torque to zero at least temporarily.

4. The method according to claim 1, further comprising the act of additionally generating at least one of a visual, acoustic and haptic warning signal when it is determined that the driver may attempt to leave the vehicle.

5. The method according to claim 4, wherein the at least one additional signal is provided in one or more escalating stages.

6. The method according to claim 1, wherein the act of analyzing signals further comprises the act of analyzing at least one of:
   (a) a belt contact signal;
   (b) a door closing signal;
   (c) a steering wheel contact sensor system signal;
   (d) an interior sensing system signal; and
   (e) a steering wheel contact recognition unit signal.

7. The method according to claim 2, wherein the act of analyzing signals further comprises the act of analyzing at least one of:
   (a) a belt contact signal;
   (b) a door closing signal;
   (c) a steering wheel contact sensor system signal;
   (d) an interior sensing system signal; and
   (e) a steering wheel contact recognition unit signal.

8. The method according to claim 3, wherein the act of analyzing signals further comprises the act of analyzing at least one of:
   (a) a belt contact signal;
   (b) a door closing signal;
   (c) a steering wheel contact sensor system signal;
   (d) an interior sensing system signal; and
   (e) a steering wheel contact recognition unit signal.

9. The method according to claim 4, wherein the act of analyzing signals further comprises the act of analyzing at least one of:
   (a) a belt contact signal;
   (b) a door closing signal;
   (c) a steering wheel contact sensor system signal;
   (d) an interior sensing system signal; and
   (e) a steering wheel contact recognition unit signal.

10. The method according to claim 1, wherein the analyzing act determines the driver is leaving the motor vehicle by analyzing a signal of a seat occupation recognition unit.

11. The method according to claim 1, further comprising the act of targeting actuation of drive actuators upon determining that the driver may attempt to leave the motor vehicle in order to oscillate the motor vehicle or the vehicle body.

* * * * *